US008633817B2

(12) United States Patent
Khorashadi et al.

(10) Patent No.: US 8,633,817 B2
(45) Date of Patent: Jan. 21, 2014

(54) MAPPING WIRELESS SIGNALS WITH MOTION SENSORS

(75) Inventors: Behrooz Khorashadi, San Jose, CA (US); Saumitra Mohan Das, San Jose, CA (US); Vinay Sridhara, Santa Clara, CA (US); Alok Aggarwal, Foster City, CA (US); Christopher Brunner, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 839 days.

(21) Appl. No.: 12/851,458

(22) Filed: Aug. 5, 2010

(65) Prior Publication Data

US 2011/0090081 A1 Apr. 21, 2011

Related U.S. Application Data

(60) Provisional application No. 61/253,767, filed on Oct. 21, 2009.

(51) Int. Cl.
*G08B 1/08* (2006.01)

(52) U.S. Cl.
USPC .......... 340/539.13; 340/572.1; 340/573.3; 340/573.4; 340/539.2; 340/539.21

(58) Field of Classification Search
USPC .............. 340/539.13, 572.1, 988–995.1, 340/573.3–573.4, 539.2–539.21; 701/200; 705/10

See application file for complete search history.

(56) References Cited

U.S. PATENT DOCUMENTS

| 5,821,513 | A  | * | 10/1998 | O'Hagan et al. | 235/383 |
| 6,011,487 | A  | * | 1/2000  | Plocher | 340/8.1 |
| 6,112,988 | A  | * | 9/2000  | Powell | 235/383 |
| 6,388,688 | B1 | * | 5/2002  | Schileru-Key | 715/854 |
| 6,396,413 | B2 | * | 5/2002  | Hines et al. | 340/8.1 |

(Continued)

FOREIGN PATENT DOCUMENTS

| DE | 102004035531 A1 | 2/2006 |
| TW | 200825443 A | 6/2008 |

(Continued)

OTHER PUBLICATIONS

International Search Report—PCT/US2010/053367—International Search Authority, European Patent Office, Dec. 30, 2010.

(Continued)

*Primary Examiner* — Daniel Wu
*Assistant Examiner* — Son M Tang
(74) *Attorney, Agent, or Firm* — Arnold J. Gum (57) ABSTRACT

A displacement device for mapping wireless signal fingerprints includes motion sensors and at least one of a received signal strength indicator (RSSI) sensor and a round trip time (RTT) sensor. The motion sensors may include a pedometer and one or more sensors to receive turn information. The start position of the displacement device is initialized and as the displacement device is moved through an environment, the position of each measurement location is determined using the initialized position and data from the motion sensors. The measurement position along with the RSSI and/or RTT measurement is stored in a database, from which a map can be generated. The position of the access point may be determined using the RSSI measurement or RTT measurement. Additionally, accumulated errors in the measurement position may be monitored and when greater than a threshold, a user may be prompted to reinitialize the position of the displacement device.

47 Claims, 3 Drawing Sheets

(56) References Cited

U.S. PATENT DOCUMENTS

| | | | |
|---|---|---|---|
| 6,587,784 B1 * | 7/2003 | Okude et al. | 701/454 |
| 6,659,344 B2 * | 12/2003 | Otto et al. | 235/381 |
| 7,006,982 B2 * | 2/2006 | Sorensen | 705/7.29 |
| 7,038,584 B2 * | 5/2006 | Carter | 340/539.13 |
| 7,183,910 B2 * | 2/2007 | Alvarez et al. | 340/539.13 |
| 7,242,306 B2 * | 7/2007 | Wildman et al. | 340/573.1 |
| 7,336,182 B1 * | 2/2008 | Baranowski et al. | 340/572.1 |
| 7,420,464 B2 * | 9/2008 | Fitzgerald et al. | 340/539.13 |
| 7,463,143 B2 * | 12/2008 | Forr et al. | 340/539.13 |
| 7,592,909 B2 * | 9/2009 | Zaruba et al. | 340/539.13 |
| 7,602,338 B2 * | 10/2009 | Smith et al. | 342/451 |
| 7,606,728 B2 * | 10/2009 | Sorensen | 705/7.29 |
| 7,710,267 B2 * | 5/2010 | Toyokawa et al. | 340/568.5 |
| 7,734,513 B2 * | 6/2010 | Bonner et al. | 705/26.9 |
| 7,739,705 B2 * | 6/2010 | Lee et al. | 725/10 |
| 7,957,900 B2 * | 6/2011 | Chowdhary et al. | 701/300 |
| 8,046,160 B2 * | 10/2011 | Carter et al. | 701/498 |
| 8,179,253 B2 * | 5/2012 | Zaruba et al. | 340/539.13 |
| 8,239,277 B2 * | 8/2012 | Lee et al. | 705/26.1 |
| 8,373,562 B1 * | 2/2013 | Heinze et al. | 340/572.1 |
| 2002/0161651 A1 * | 10/2002 | Godsey et al. | 705/22 |
| 2003/0055707 A1 * | 3/2003 | Busche et al. | 705/10 |
| 2005/0102101 A1 | 5/2005 | Beesley et al. | |
| 2005/0186972 A1 | 8/2005 | Ogino et al. | |
| 2006/0071780 A1 | 4/2006 | McFarland | |
| 2006/0074494 A1 | 4/2006 | McFarland | |
| 2007/0184850 A1 | 8/2007 | Hupp et al. | |
| 2008/0157957 A1 | 7/2008 | Pitchers et al. | |
| 2009/0009397 A1 | 1/2009 | Taylor et al. | |
| 2009/0066473 A1 | 3/2009 | Simons | |

FOREIGN PATENT DOCUMENTS

| | | |
|---|---|---|
| TW | 200914861 A | 4/2009 |
| WO | 2008108788 A2 | 9/2008 |
| WO | 2009021068 | 2/2009 |

OTHER PUBLICATIONS

Taiwan Search Report—TW099135975—TIPO—Mar. 21, 2013.
Jen-Yen Chen, Jianghai Hu, "Probabilistic Map Building by Coordinated Mobile Sensors", Proceedings of the 2006 IEEE International Conference on Networking, Sensing and Control, 1/06, pp. 807-812.
Jaehong Shim, "Self-localization of a mobile robot using a single vision sensor", Proc. of SPIE vol. 6718, Oct. 2007, pp. 6718OB-1 to 6718OB-8.

* cited by examiner

MAPPING WIRELESS SIGNALS WITH MOTION SENSORS

CROSS REFERENCE TO RELATED APPLICATIONS

This application claims the benefit of Provisional Application No. 61/253,767, filed Oct. 21, 2009, which is assigned to the assignee hereof and hereby expressly incorporated by reference herein.

BACKGROUND

Accurate position information for mobile stations, such as cellular or other wireless communication devices, is becoming prevalent in the communications industry. The Global Positioning System (GPS) offers an approach to providing wireless mobile station position determination. A GPS user can derive precise navigation information including three-dimensional position, velocity and time through information gained from satellite vehicles (SVs) in orbit around the earth. The signals that are received from the SVs are typically rather weak. Therefore, in order to determine the position of the receiver, the receiver must be sufficiently sensitive to acquire these weak signals and interpret the information that is represented by them.

One limitation of current GPS receivers is that their operation is limited to situations in which multiple satellites are clearly in view, without obstructions, and where a good quality antenna is properly positioned to receive such signals. As such, they normally are unusable in areas with blockage conditions, such as where there is significant foliage or building blockage (e.g., urban canyons) and, particularly, within buildings.

One of the major holdups in implementation of current indoor location based services based on wireless signals is the prerequisites needed to enable such a system. At a minimum, the indoor area has to be covered either by wireless access points deployed in the indoor area or the indoor area has to be covered by wireless access points deployed in the surrounding buildings that cover the indoor area. In addition, prior knowledge of the locations mapped to the wireless signal fingerprints, which enable the location based system, are needed on the handset to enable a location fix. In addition many of the useful services, such as routing and POI (Point of Interest) search that harness this system, require a base map of the current location. This can be a significant problem as mapping and manually locating all access points and points of interest can be an extremely tedious, time consuming and error prone task.

SUMMARY

A displacement device for mapping wireless signal fingerprints includes motion sensors and at least one of a received signal strength indicator (RSSI) sensor and a round trip time (RTT) sensor. The motion sensors may include, e.g., a 3-axis accelerometer driven pedometer and a sensor to receive user provided turn information such as 90 degree turn indications or at least one of a gyroscope, accelerometer and magnetometer. Motion sensors may further include a satellite positioning system. The start position of the displacement device is initialized and as the displacement device is moved through an environment, the position of each measurement location is determined using the initialized position and data from the motion sensors. The measurement position along with the RSSI and/or RTT measurement is stored in a database, from which a map can be generated. The position of the access point may be determined by the RSSI measurement or RTT measurement. Additionally, accumulated errors in the measurement position may be monitored and when greater than a threshold, a user may be prompted to reinitialize the position of the displacement device.

DETAILED DESCRIPTION

A system and method described herein automates the process of generating a wireless access fingerprint map and an annotation layer containing points of interest, which may be anything that is wirelessly detected including wireless access points, for an environment with blockage conditions, such as an indoor environment. The system and method uses a displacement device that includes motion sensors to determine the magnitude and direction of changes in location from an initialized start location and a wireless signal measurement system to measure wireless signal parameters. The motion sensors may include, e.g., including GPS and user input (90 degrees left turn, 90 degrees right turn, non 90 degrees turn) to determine the magnitude and direction of changes in location from an initialized start location and a wireless signal measurement system to measure wireless signal parameters. The measured parameters of the wireless signals and the corresponding measurement locations are used to generate a wireless signal map or fingerprint map within a desired environment with respect to a coordinate system, which may be a relative coordinate system or an absolute coordinate system. Accordingly, a wireless signal fingerprint map is generated which will enable and enhance the location based system. Further, by identifying access point locations using the recorded data, there is no need to manually find these locations, which may be a time intensive manual task.

Figure 1:
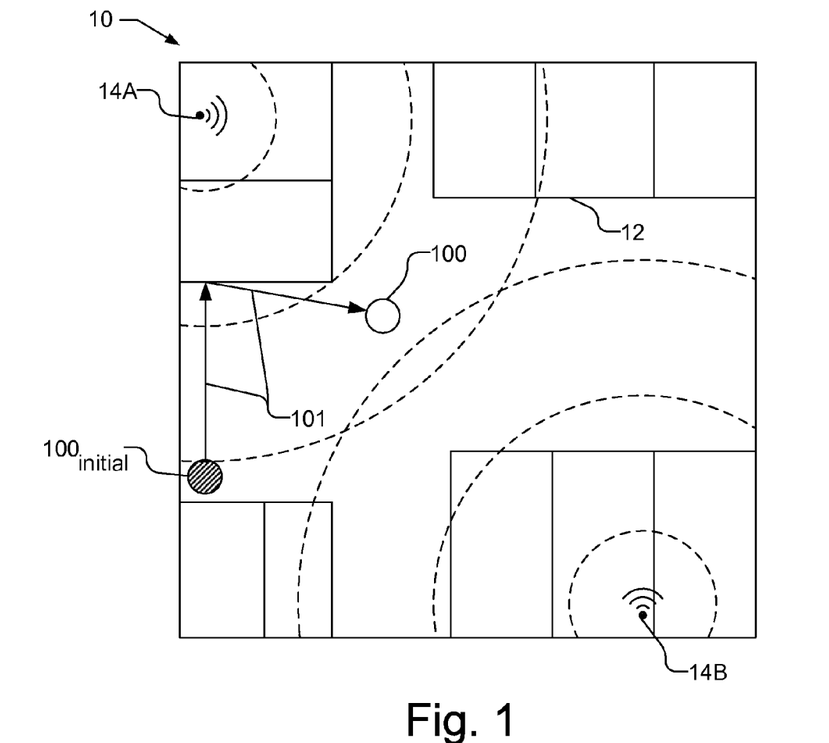
FIG. 1 illustrates a displacement device used to "map" an environment using motion sensors and wireless signal data collection system.

FIG. 1 illustrates an indoor environment 10 that suffers from blockage conditions, i.e., little or no GPS signals are received within the environment 10. The environment 10 is illustrated, by way of example, as a building with multiple rooms 12, but it may be any environment with wireless access points. As illustrated, multiple wireless access points 14A, 14B are present in the environment 10. The wireless signals produced by the access points 14A, 14B are illustrated by concentric broken circles centered on the access points 14A, 14B. A displacement device 100 is used to move around the environment 10 measuring and recording wireless signal parameters along with the locations that the measurements are made to "map" the environment 10. Displacement device 100 includes motion sensors to determine the measurement locations and a wireless signal data collection system to detect and determine wireless signal parameters. The wireless signal parameters may be, e.g., the received signal strength and/or Round Trip Time (RTT) for wireless signals collected from the access points 14A, 14B in the environment 10. The displacement device 100 moves through the environment 10, as illustrated by the arrows 101, while the motion sensors provide data indicating the distance and direction of travel of the displacement device 100 from an initial location $100_{initial}$, and the wireless signal data collection system collects data. The measured wireless signal parameters and corresponding measurement locations are stored to a database. The database can be used to produce a map of the collected data, i.e., a fingerprint of the wireless signals, from which the position of the access points may be determined as well as the general physical layout of the environment 10. Additionally, by recording the maximum (or minimum) values of the wireless signal parameters for an access point along with the corresponding measurement locations, the location of the access point can be determined automatically.

Figure 2:
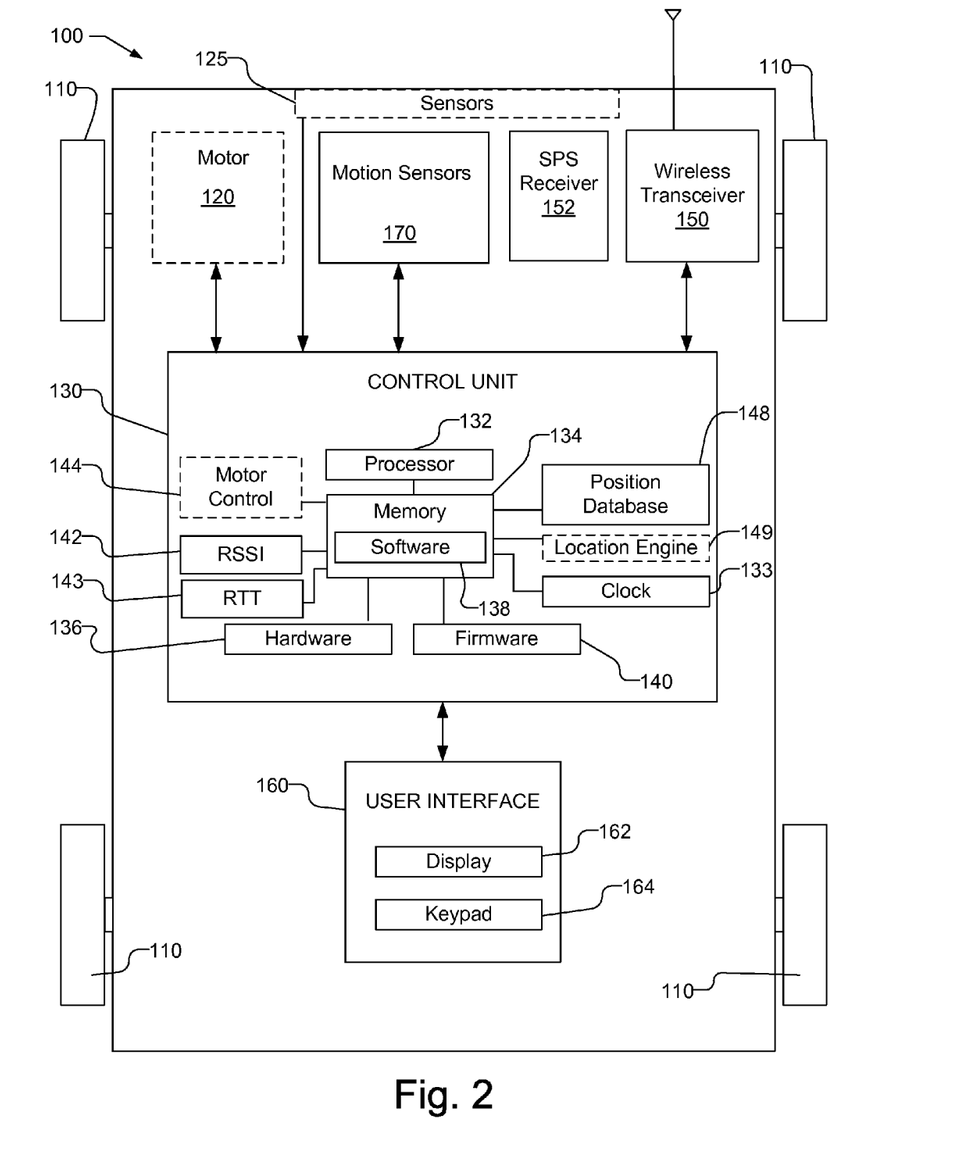
FIG. 2 is a block diagram of a displacement device capable of collecting and recording wireless signal data along with determining and recording the corresponding location of the displacement device when the data is collected.

FIG. 2 is a block diagram of a displacement device capable of collecting and recording wireless signal data along with determining and recording the corresponding location of the displacement device when the data is collected. As illustrated, displacement device 100 includes means for sending and receiving wireless signals to wireless access points, e.g., a wireless transceiver 150. The transceiver 150 of the displacement device 100 may be implemented in conjunction with various wireless communication networks, including cellular towers and from wireless communication access points, such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN. The displacement device 100 may be, e.g., a mobile platform, such as a cellular or other wireless communication device, smart phone, personal communication system (PCS) device, personal navigation device (PND), Personal Information Manager (PIM), Personal Digital Assistant (PDA), laptop or other suitable mobile device which is capable of receiving and measuring the strength of wireless communication and/or navigation signals.

The displacement device 100 also includes means for sensing the displacement of the device, e.g., one or more motion sensors 170. The motion sensors 170 produce data with respect to the direction and the magnitude of movement of the displacement device 100 from an initial position. Examples of motion sensors 170 that may be used with the displacement device 100 include 3-axis accelerometer to drive a pedometer, a sensor (e.g., keypad 164) to receive user provided turn information, e.g., 90 degrees left turn, 90 degrees right turn, non 90 degrees turn), and a receiver 152 for satellite positioning systems (SPS), such as the Global Positioning System (GPS), as well as Galileo, Glonass or Compass, as well as regional systems, such as Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. Additional or alternative motion sensors may include magnetometer, solid state compasses, gyroscopes, and pressure sensors. If the displacement device is not a commercial available mobile platform, motion sensors such as wheel sensors and odometers may be included as well. The motion sensors 170 may be coupled to wheels 110 on the displacement device 100 to detect the distance traveled by the displacement device 100. The direction of travel may be determined using, e.g., multiple wheel sensors, or at least one of a gyroscope, accelerometer and magnetometer or compass.

The transceiver 150 and motion sensors 170 communicate with a control unit 130 that accepts and processes data from the wireless transceiver 150 and motion sensors 170 as well as controls the remainder of the operation of the displacement device 100. The vector displacement data from the motion sensors 170 is provided to the control unit 130, which includes a position database 148 that is used to store and update the position of the displacement device 100. As the control unit 130 determines new position of the displacement device 100 using the motion sensors 170, the position database 148 is updated with the new positional information.

Figure 3:
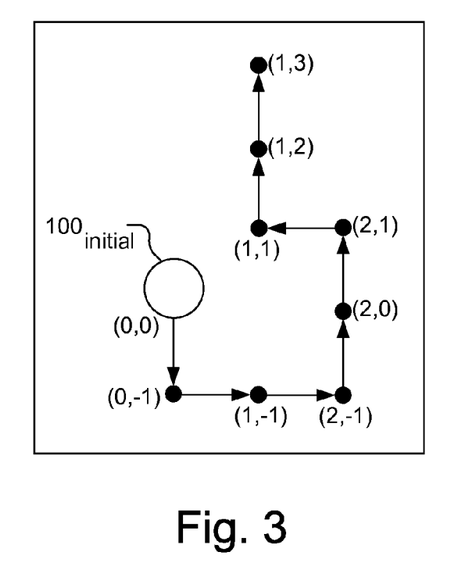
FIG. 3 illustrates a relative coordinate system and the path and recording locations of a displacement device with respect to an initial location.

FIG. 3, by way of example, illustrates a relative coordinate system and the path and recorded locations of a displacement device 100 with respect to an initial location $100_{initial}$. All measurements may be related to the arbitrary start point $100_{initial}$ designated as (0,0). At each measurement location, wireless data is collected, e.g., using transceiver 150. Thus, the location of each wireless signal measurement is known with respect to an arbitrary starting location. If desired, the relative coordinate system may be translated into other coordinate systems, e.g., by translating a location in the relative coordinate system into the desired coordinate system, the remaining locations in the relative coordinate system may then be easily translated. For example, if a location (5,3) in the relative coordinate system is (0,0) in the desired coordinate plane then a simple translation of X-5 and Y-3 translates all other locations in the relative coordinate system into the desired coordinate system. This mapping of relative coordinate system to actual coordinate system can be done using a number of techniques one of which is landmark recognition. For example, if the displacement device 100 is roaming and scanning a environment and is able to identify a particular point as a landmark using vision location mapping technologies then all the relative coordinates can be translated to actual coordinates. In an alternative embodiment, an absolute coordinate system may be used, where each arbitrary start point is designated by its SPS coordinates. This allows a location based search to easily work also when the search is taking place outside of the venue of interest. Moreover, initializing to SPS coordinates is easy given that commercially available mobile platforms, such as a smart phone, include SPS.

The control unit 130 may be provided by a processor 132 and associated memory 134, a clock 133, hardware 136, software 138, and firmware 140. It will be understood as used herein that the processor can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

The control unit 130 further includes a received signal strength indicator (RSSI) system 142 and RTT sensor 143, which may be separate from or part of the processor 132. The RSSI sensor 142 determines the signal strength of any wireless signal received by the wireless transceiver 150. The RTT sensor 143 determines the round trip time for a wireless signal by monitoring the time via clock 133 to receive a signal from an access point in response to a signal sent by the transceiver 150.

The displacement device 100 also includes a user interface 160 that is in communication with the control unit 130, e.g., the control unit 130 accepts data from and provides data to the user interface 160. The user interface 160 may include a display 162 that displays, e.g., a map of the environment 10, as well as control menus and positional information. The user interface 160 may also include a keypad 164 or other input device through which the user can input information into the displacement device 100. In one embodiment, the keypad 164 may be integrated into the display 162, such as a touch screen display. In another embodiment, an application run on a commercially available mobile platform, such as a smart phone, may provide instructions via the user interface 160 to guide the user to build the wireless signal fingerprint map and the user interface 160 may serve as a motion sensor by receiving user provided turn information, e.g., user designated 90 degrees left turn, 90 degrees right turn, and non 90 degrees turn.

Additionally, the displacement device 100 may include a motor 120 to power wheels 110, if used, along with motor control 144 and a location engine 149 to control the motor 120. The motor 120, motor control 144 and location engine 149 may be used to automatically move the displacement device 100 around the environment 10 during the mapping process. Sensors 125, such as infrared light sensors or impact sensors, may be used to detect obstacles in the path of the displacement device 100. The location engine 149 may apply conventional coverage algorithms to ensure that the total desired environment is traversed and mapped. Alternatively, the displacement device 100 may be powered by a human, in which case, the motor 120, motor control 144, location engine 149, and sensors 125 are unnecessary. The displacement device 100 may be a dedicated device or may be attached to another device, such as a janitor's cart. The displacement device 100 may include additional components, such as batteries and a communication port for the displacement device 100 to provide data to an external database. Alternatively, the displacement device may be mobile platform, such as a smart phone.

The methodologies described herein may be implemented by various means depending upon the application. For example, these methodologies may be implemented in hardware 136, software 138, firmware 140, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

For example, software 138 codes may be stored in memory 134 and executed by the processor 132 and may be used to run the processor and to control the operation of the displacement device 100 as described herein. For example, a program code stored in a computer-readable medium, such as memory 134, may include program code to determine at least one of received signal strength and round trip time for wireless signals from data provided by a RSSI sensor and a RTT sensor, to determine a measurement position based on an initialized position and data from motion sensors when the at least one of received signal strength and round trip time is measured, and to store the determined at least one of a received signal strength and round trip time in a database with the corresponding measurement position. The program code stored in a computer-readable medium may further include program code to determine the position of the access point using the received signal strength or round trip time for the access point. The program code stored in a computer-readable medium may further include program code estimate accumulated errors in the measurement position and to prompt the reinitializing of the position after the accumulated errors have exceeded a predetermined threshold. Alternatively, software 138 codes may be stored in an application store and may be downloaded on a mobile platform, such as a cellular telephone or smart phone. The operating systems of the mobile platform provide standard application programming interfaces (APIs) to several relevant functional units, such as wireless LAN and motion sensors such as accelerometer and SPS, thereby reducing the size of the application itself.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 4:
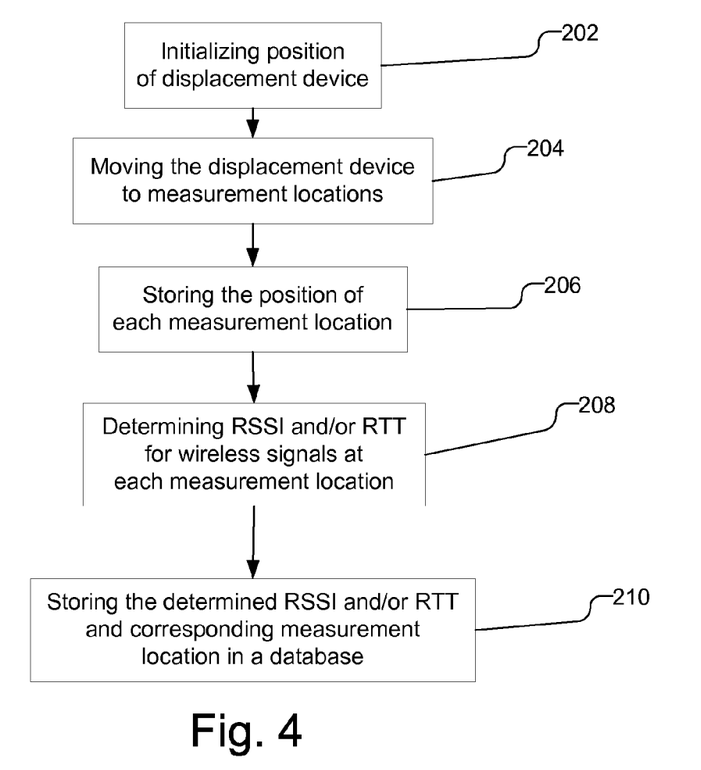
FIG. 4 is a flow chart showing a method of mapping wireless signals using a vector displacement device.

FIG. 4 is a flow chart showing a method of mapping wireless signals using displacement device 100. As illustrated in FIG. 4, the position of the displacement device 100 is initialized (202). Initializing the position of the displacement device 202 may be performed by placing the displacement device 100 at a designated location and starting the mapping routine from that location. Alternately, a user may indicate the current location of the displacement device 100 on a digital map of the environment 10 that is shown in the display 162. In another embodiment, the initialized position may be automatically entered, e.g., by a SPS position fix. The SPS fix may not be highly accurate at the initial location in front of the building of interest. In this case the application may ask the user to walk along the building of interest on a straight line until a good fix has been obtained, turn back until a good fix has been obtained, and return to the initial location. By fusing SPS data with the accelerometer driven pedometer data using a motion model limited to walking on a line, an accurate position estimate of the initial location can be achieved. Furthermore, the pedometer can be calibrated in the process. In yet another embodiment, the initialized position may be automatically entered by an electronic beacon having a known location that the displacement device 100 passes over or near.

The displacement device 100 is then moved to a plurality of measurement locations (204). Movement of the displacement device 100 may be performed manually, e.g., by a user holding a mobile platform while walking. Distance is estimated using the pedometer. Turns may be indicated by the user in form of 90 degree left, 90 degree right, or non-90-degree turn. Since most buildings have a rectangular layout, many 90 degree turns are expected. Humans are good at recognizing 90 degree turns, and thus orientation may be based on 90 degree turns rather than a compass reading, which suffers from inaccuracies to due to magnetic anomalies.

However, if desired, alternative sensors may be used to determine whether and how much the device has turned. For example, one or more of gyroscopes, accelerometers and magnetometers may be used to detect turns of the displacement device 100. With the combination of multiple sensors, such as gyroscopes, accelerometers and magnetometers, magnetic anomalies found in buildings may be adequately addressed. Limitations in the accuracy of the sensors may be addressed, e.g., by assuming 90 degree turns are made when the sensors indicate a turn of 85 degrees to 95 degrees. The use of gyroscopes, accelerometers and magnetometers may be particularly useful when the displacement device has a constant alignment angle, i.e., the angle between the direction of motion and the direction that the displacement device is pointing remains constant, such as when the displacement device 100 is attached to the user's belt or held in a pocket. With a non-constant alignment angle, e.g., the displacement device is held in the hand, drift may be reduced by attaching the displacement device 100 to, e.g., a shoe, so that moments of no motion may be exploited to reset the filters.

Furthermore, the user may close the loop several times. Loop closures can be recognized by repeating wireless signal fingerprint patterns and can be used to address inaccuracies in distance estimation. Additionally, the user may provide a vertical vector displacement, e.g., in the form of a building floor number. In an alternative embodiment, movement of the displacement device 100 may be performed by pushing the displacement device 100 through the environment 10, or automatically using, e.g., the motor 120, motor control 144, sensors 125, and location engine 149, illustrated in FIG. 2. As the displacement device 100 is moved, the motion sensors 170 provide data to the control unit 130 indicating the distance and angle of movement of the displacement device 100. At each location that a parameter of the wireless signal is measured, e.g., received signal strength and/or RTT, the position of the displacement device 100 as determined from data produced by the motion sensors 170 and is recorded and stored in memory 134 (206).

At each measurement location, a wireless signal parameter, such as received signal strength and/or RTT, is determined (208) and stored along with the corresponding measurement location in memory 134 (210). The measurement location and parameters of the wireless signals are sometimes referred to as a wireless fingerprint. For example, the signal strength of the wireless signals may be determined by the RSSI sensor 142. Alternatively, or additionally, the round trip time of the wireless signals may be determined using the RTT sensor 143, which may control the wireless transceiver 150 to produce a wireless signal to a local access point, which responds with a return signal. The RTT sensor 143 uses the clock 133 to determine the RTT of the wireless signal. As a result, each measurement location has a corresponding data set representing the received signal strength and/or RTT of the wireless signals at that location. The received signal strength and/or RTT of a plurality access points may be measured to provide a detailed wireless fingerprint for the environment.

Knowledge of the locations of access points within the environment may be useful in acquiring a position fix when SPS is unavailable. Accordingly, in one embodiment, the position of an access point may be determined using the RSSI measurements and/or the RTT measurements and their corresponding positions. For example, for each access point that is accessed, a maximum value of the RSSI measurement and/or minimum value for the RTT measurement may be maintained, along with the corresponding measurement location. This measurement location can then be assigned as the actual location of the access point once the entire environment has been traversed. Alternatively, the position of the access point may be determined by translating a plurality of the RSSI measurements and/or RTT measurements into a distance estimate (e.g., using ranging models that estimate RSSI and/or RTT vs. distance) and using the positions that correspond to the RSSI and/or RTT measurements along with the distance estimates to determine the position of the access point using trilateration. Thus, the wireless fingerprint, including the locations of the access points, is mapped and stored in a database.

Figure 5:
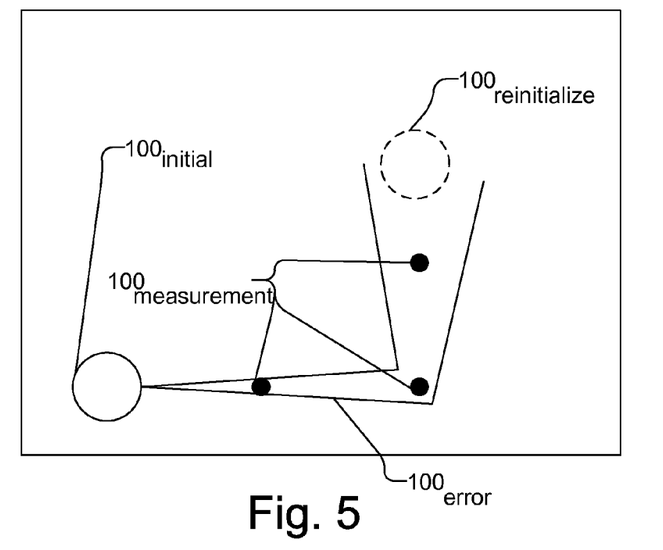
FIG. 5 illustrates the accumulation of errors of the displacement device while moving to record the wireless fingerprint.

In one embodiment, accumulated errors of the motion sensors 170 are tracked. FIG. 5 illustrates the accumulation of errors of the displacement device 100 while moving to record the wireless fingerprint. The initial location $100_{initial}$ of the displacement device 100 is illustrated along with several measurement locations $100_{measurement}$. As the displacement device 100 moves, the error $100_{error}$ associated with the position of the displacement device 100 accumulates. If the accumulated error $100_{error}$ exceeds an acceptable threshold, as indicated at position $100_{reinitialize}$, the displacement device 100 may provide an indication to a user that the accumulated errors have exceeded a threshold, prompting the user to manually input the current position to reinitialize the system. The current position may be input by a user by indicating the position on a digital map on the display 162 or by entering coordinates, e.g., on the keypad 164.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

The invention claimed is:

1. A method comprising:
    generating an initialized position, using a satellite positioning system (SPS), of a displacement device having motion sensors and at least one of a received signal strength indicator (RSSI) sensor and a round trip time (RTT) sensor;
    moving the displacement device within an environment to a plurality of measurement locations;
    determining at least one of a received signal strength and a round trip time for wireless signals at each of the plurality of measurement locations;
    determining a position corresponding to each of the plurality of measurement locations based on the initialized position and data from the motion sensors, wherein the data from the motion sensors comprises a vector displacement estimation, and wherein accuracy of the vector displacement estimation is increased by obtaining an additional SPS fix; and
    storing in a database the at least one of the received signal strength and the round trip time for wireless signals and the corresponding position for each of the plurality of measurement locations.

2. The method of claim 1, wherein the displacement device moves automatically through the environment.

3. The method of claim 1, wherein the displacement device is manually moved.

4. The method of claim 1, further comprising generating a map of the environment using the corresponding position for each of the measurement locations stored in the database.

5. The method of claim 1, further comprising determining the position of an access point using the determined at least one of the received signal strength and round trip time.

6. The method of claim 5, wherein the position of the access point is determined by determining a measurement location with at least one of a maximum value of a received signal strength measurement and a minimum value of a round trip time measurement for the access point and using the corresponding position as the position of the access point.

7. The method of claim 5, wherein the position of the access point is determined by translating a plurality of at least one of the received signal strengths and round trip times to distance estimates for the plurality of measurement locations and using corresponding positions for the plurality of measurement locations and the distance estimates to determine the position of the access point.

8. The method of claim 1, wherein generating the initialized position of the displacement device comprises designating a start location of the displacement device as an origin in an arbitrary coordinate system, the method further comprising translating the arbitrary coordinate system to another coordinate system.

9. The method of claim 1, wherein the motion sensors comprise a pedometer driven by a 3 axis accelerometer.

10. The method of claim 1, wherein the data from the motion sensors further comprises user provided turning information.

11. The method of claim 10, wherein the user provided turning information comprises a user designated 90 degrees left turn, 90 degrees right turn, and non 90 degrees turn.

12. The method of claim 1, wherein the data from the motion sensors further comprises data from at least one of a gyroscope, accelerometer and magnetometer to provide turning information.

13. The method of claim 1, further comprising recognizing loop closures to compensate for pedometer drift to increase accuracy of the vector displacement estimation.

14. The method of claim 1, wherein generating the initialized position of a displacement device is performed using a satellite positioning system (SPS) and moving in a first direction from an initial location outside the environment until a first good SPS fix is obtained, returning in a second direction opposite the first direction until a second good SPS fix is obtained, and returning to the initial location and fusing data from the first good SPS fix and the second good SPS fix with the pedometer based distance estimation.

15. The method of claim 1, wherein the position of each of the plurality of measurement locations is further determined based on a vertical vector displacement provided by a user as a building floor number.

16. The method of claim 1, wherein motion sensors comprise wheel displacement sensors and at least one of an accelerometer, gyroscope, magnetometer, and compass.

17. The method of claim 1, the method further comprising estimating accumulated errors from the motion sensors and reinitializing a position of the displacement device after accumulated errors have exceeded a predetermined threshold.

18. The method of claim 17, wherein generating the initialized position of the displacement device comprises designating a start location of the displacement device in a coordinate system, and reinitializing the position of the displacement by designating a current position of the displacement device in the coordinate system.

19. The method of claim 18, further comprising providing an indication that the accumulated errors have exceeded the predetermined threshold and reinitializing the position of the displacement device in response to the indication.

20. The method of claim 17, wherein initializing the position of the displacement device comprises entering the position in a digital map.

21. An apparatus comprising:
    at least one of a received signal strength indicator (RSSI) sensor and a round trip time (RTT) sensor that determine at least one of RSSI measurements and RTT measurements for wireless signals within an environment;
    motion sensors that provide data related to direction and magnitude of movement of the at least one of the RSSI sensor and the RTT sensor;
    a processor connected to the motion sensors and at least the RSSI sensor and the RTT sensor;
    memory connected to the processor; and
    software held in the memory and run in the processor to cause the processor to use an initialized position, generated using a satellite positioning system (SPS), and the data from the motion sensors, wherein the data from the motion sensors comprises a vector displacement estimation, and wherein the accuracy of the vector displacement estimation is increased by obtaining an additional SPS fix, to determine measurement locations when the at least one of the RSSI measurements and the RTT measurements are made and to store the determined at least one of RSSI measurements and RTT measurements with corresponding measurement locations in the memory.

22. The apparatus of claim 21, wherein the motions sensors comprise a 3-axis accelerometer driven pedometer.

23. The apparatus of claim 22, wherein the motions sensors further comprise a sensor for receiving user provided turning information.

24. The apparatus of claim 23, wherein the user provided turning information comprises a user designated 90 degrees left turn, 90 degrees right turn, and non 90 degrees turn.

25. The apparatus of claim 22, wherein the motions sensors further comprise at least one of a gyroscope, accelerometer, and magnetometer.

26. The apparatus of claim 21, further comprising wheels and a motor coupled to the wheels.

27. The apparatus of claim 21, wherein software held in the memory and run in the processor causes the processor to generate a map using corresponding measurement locations.

28. The apparatus of claim 21, wherein software held in the memory and run in the processor causes the processor to determine a position of an access point using the at least one of the RSSI measurements and the RTT measurements.

29. The apparatus of claim 28, wherein the software held in the memory and run in the processor causes the processor to determine the position of the access point by determining a measurement location with at least one of a maximum value of a RSSI measurement and a minimum value of a RTT measurement for the access point and to store the corresponding measurement location as the position of the access point.

30. The apparatus of claim 28, wherein the software held in the memory and run in the processor causes the processor to determine the position of the access point by translating a plurality of the at least one of the RSSI measurements and the RTT measurements to distance estimates and using the corresponding measurement locations and the distance estimates to determine the position of the access point.

31. The apparatus of claim 21, wherein motion sensors comprise wheel displacement sensors and at least one of a gyroscope, accelerometer, magnetometer, and compass.

32. The apparatus of claim 21, wherein software held in the memory and run in the processor causes the processor to estimate accumulated errors from the motion sensors and to prompt reinitializing a position after the accumulated errors have exceeded a predetermined threshold.

33. The apparatus of claim 32, further comprising a display coupled to the processor and memory, wherein a digital map is displayed on the display and reinitializing the position is performed using the digital map.

34. A system for mapping wireless signal parameters within an environment, the system comprising:
  means for generating an initialized position, using a satellite positioning system (SPS),
  means for measuring wireless signal parameters including at least one of received signal strength (RSSI) and round trip time (RTT);
  means for moving the means for measuring wireless signal parameters within the environment;
  means for determining a position of the means for measuring wireless signal parameters based on direction and magnitude of movement from an initialized position within the environment, wherein the data from the means for determining a position of the means for measuring wireless signal parameters comprises a vector displacement estimation, and wherein accuracy of the vector displacement estimation is increased by obtaining an additional SPS fix; and
  means for storing wireless signal parameters with corresponding positions of the means for measuring wireless signal parameters when the wireless signal parameters were measured.

35. The system of claim 34, further comprising means for determining a position of an access point using the wireless signal parameters.

36. The system of claim 35, wherein the means for determining the position of the access point determines a maximum value of a wireless signal parameter for the access point, wherein a corresponding position of the means for measuring wireless signal parameters when the wireless signal parameter with the maximum value was measured is stored as the position of the access point.

37. The system of claim 35, wherein the means for determining the position of the access point translates a plurality of at least one of the received signal strengths and round trip times to distance estimates and using the corresponding positions and the distance estimates to determine the position of the access point.

38. The system of claim 34, wherein the means for determining a position comprises wheel displacement sensors and at least one of a gyroscope, accelerometer, magnetometer, and compass.

39. The system of claim 34, wherein the means for determining a position comprises a 3-axis accelerometer driven pedometer.

40. The system of claim 39, wherein the means for determining a position further comprises a sensor for receiving user provided turning information.

41. The system of claim 39, wherein the means for determining a position further comprises at least one of a gyroscope, accelerometer and magnetometer.

42. The system of claim 34, further comprising means for estimating accumulated errors from means for determining the position and a means for prompting reinitializing a position after the accumulated errors have exceeded a predetermined threshold.

43. A computer-readable medium including program code stored thereon, comprising:
  program code to determine at least one of received signal strength and round trip time for wireless signals from data provided by a received signal strength indicator (RSSI) sensor and a round trip time (RTT) sensor;
  program code to determine a measurement position based on an initialized position and data from motion sensors when the at least one of received signal strength and round trip time is measured; and
  program code to store the determined at least one of a received signal strength and round trip time in a database with a corresponding measurement position.

44. A non-transitory computer-readable medium including program code stored thereon, comprising:
  program code to determine at least one of received signal strength and round trip time for wireless signals from data provided by a received signal strength indicator (RSSI) sensor and a round trip time (RTT) sensor;
  program code to determine a measurement position based on an initialized position, said initialized position generated using a satellite positioning system (SPS), and data from motion sensors, wherein the data from the motion sensors comprises a vector displacement estimation, and wherein the accuracy of the vector displacement estimation is increased by obtaining an additional SPS fix, when the at least one of received signal strength and round trip time is measured; and
  program code to store the determined at least one of a received signal strength and round trip time in a database with a corresponding measurement position.

45. The computer-readable medium of claim 44, further comprising program code to determine the position of the access point by detecting at least one of a maximum value of a RSSI measurement and a minimum value of a RTT measurement for the access point and to store the corresponding measurement position as the position of the access point.

46. The computer-readable medium of claim 44, further comprising program code to determine the position of the access point by translating the at least one of the received signal strength and round trip time for a plurality of measurement positions to distance estimates and using the corresponding stored position for the plurality of measurement positions and the distance estimates to determine the position of the access point.

47. The computer-readable medium of claim 43, further comprising program code to estimate accumulated errors in the measurement position and to prompt the reinitializing of a position after the accumulated errors have exceeded a predetermined threshold.

* * * * *